Oct. 15, 1968  K. R. MATHERS  3,405,709
RECIPROCATING GYRATORY MASSAGE ASSEMBLY
Filed Oct. 11, 1967  7 Sheets-Sheet 1

INVENTOR.
KENNETH R. MATHERS
BY *Reuben I. Carlson*
Attorney

Oct. 15, 1968   K. R. MATHERS   3,405,709
RECIPROCATING GYRATORY MASSAGE ASSEMBLY
Filed Oct. 11, 1967   7 Sheets-Sheet 3
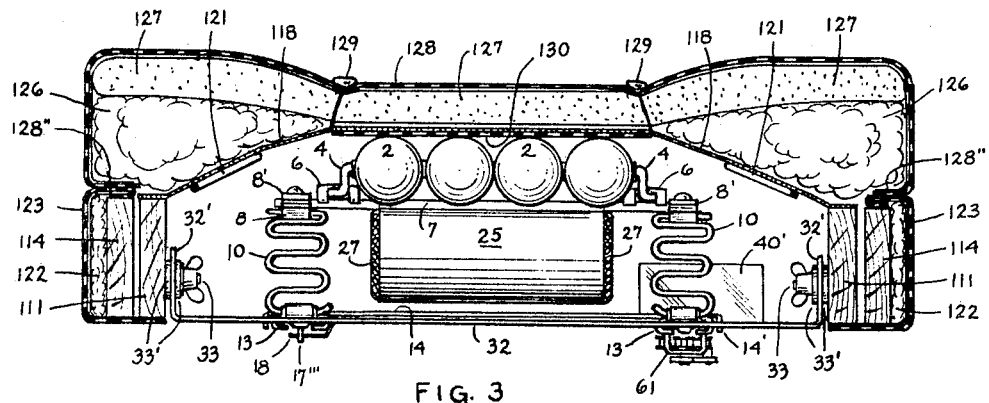
FIG. 3
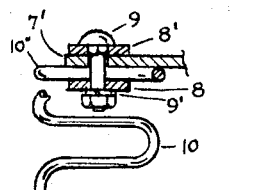
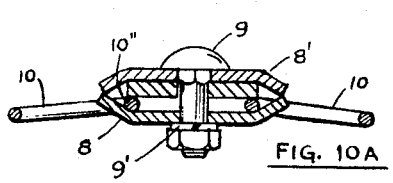
FIG. 10A
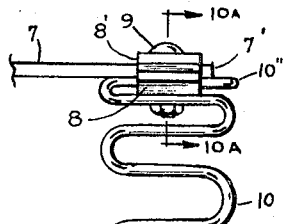
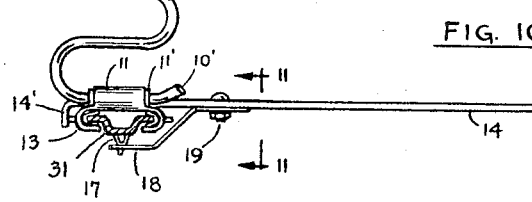
FIG. 10
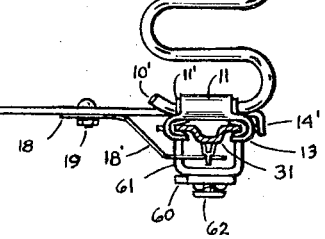
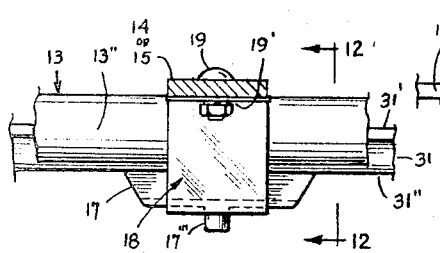
FIG. 11
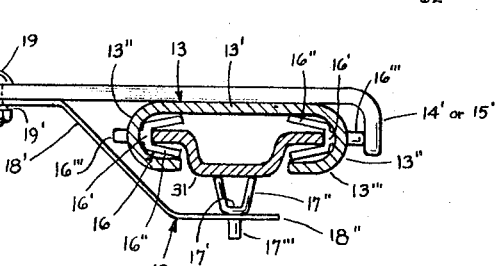
FIG. 12
INVENTOR.
KENNETH R. MATHERS
BY Reuben J. Carlson
Attorney INVENTOR.
KENNETH R. MATHERS
BY Reuben J. Carlson
Attorney Oct. 15, 1968      K. R. MATHERS      3,405,709
RECIPROCATING GYRATORY MASSAGE ASSEMBLY
Filed Oct. 11, 1967      7 Sheets-Sheet 7
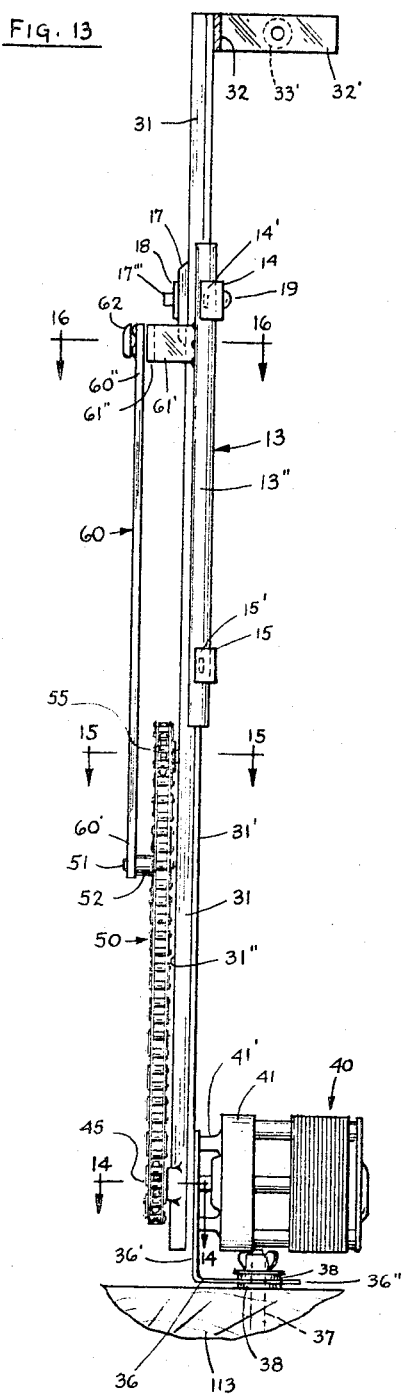
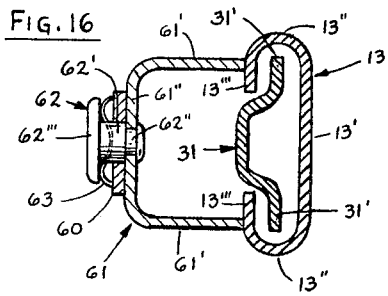
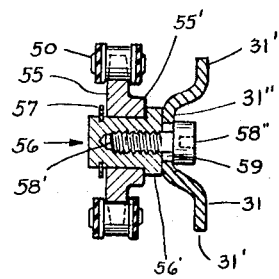
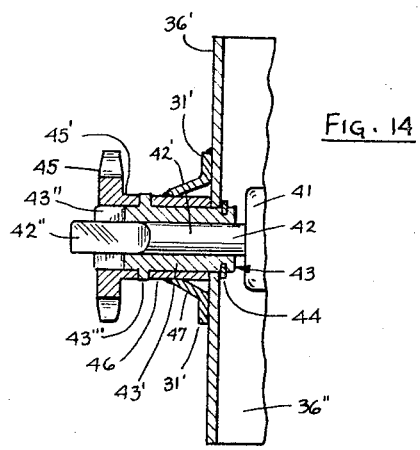
INVENTOR.
KENNETH R. MATHERS
BY *Reuben T. Carlson*
Attorney

United States Patent Office 3,405,709
Patented Oct. 15, 1968

3,405,709
RECIPROCATING GYRATORY MASSAGE
ASSEMBLY
Kenneth R. Mathers, Fredonia, N.Y., assignor to Niagara
Therapy Manufacturing Corporation, Adamsville, Pa.,
a corporation of Delaware
Continuation-in-part of application Ser. No. 541,605,
Apr. 11, 1966. This application Oct. 11, 1967, Ser.
No. 674,401
15 Claims. (Cl. 128—33)

ABSTRACT OF THE DISCLOSURE

An amproved reciprocating gyratory massage assembly designed for association with a cushioned body supporting surface, and operative to apply therapeutic massage over a selected area and length of the cushion supported body, featuring: an improved roller supporting massage carriage which will flexibly adjust to body pressure and insure controlled uniformity in the massage intensity applied to the cushion supported body; together with a carriage supporting track assembly and associated drive which smoothly and silently reciprocates the massage carriage along a predetermined length of the cushion supported body.

---

This application is a continuation-in-part of copending U.S. application Ser. No. 541,605, filed Apr. 11, 1966, issued June 25, 1968, as U.S. Patent No. 3,389,699.

Background of this invention

Mechanical massagers mounted for reciprocating travel within a cushioned framework such as a chair brackrest or massage table, and intended to transmit massage vibrations through the resilient padding and to the person's body reclining thereagainst, have heretofor been proposed, as shown for example in U.S. Patent 3,322,116. However, prior reciprocating massagers do not flexibly respond to body pressure applied to the massage applicators, and fail to transmit massage action of uniform intensity to the undulating parts of the person's body resting against the cushioned surface. Additionally, prior traveling massagers transmit undesired vibrations to the cushioned framework and the floor, produce undesired body jarring effects and noise during operation, and require frequent repair and attention in use.

Summary of this invention

Traveling massagers designed, constructed and installed in a cushioned framework in accordance with this invention, overcome the defects and drawbacks of prior traveling massagers, and operate to apply therapeutic massage action of substantially uniform intensity to all parts of the human body resting on the cushioned surface, notwithstanding the contour irregularity of the person's body extending along the path of massager travel. Furthermore, the massage carriage, tracking frame and reciprocating drive of this improved massager are correlated to operate as a unit, smoothly and noiselessly, without jarring effects on the person's body undergoing massage treatment, transmits maximum massage energy to the person's body along the path of massager travel, and is constructed and designed to have many years of useful life without adjustment, repair, or attention.

These desirable results are achieved in part by the novel construction and design of the massage carriage which supports a series of transverse rows of highly resilient rollers, balls or massage applicators, designed to freely rotate on a corresponding series of transverse tubular shafts, with each shaft separately and flexibly supported by a highly resilient spring steel frame of novel design.

The gyratory motor which produces the massage vibrations is rigidly but detachably suspended from a transverse bar in a manner to permit convenient access to the air-cooled gyratory motor. Each of the several massage applicator shafts is flexibly supported on the web portion of a U-shaped spring steel frame section, whose legs are rigidly secured in cantilever suspension to the end portions of the gyratory motor suspension bar. One or more transverse rows of resilient applicators are positioned on opposite sides of the transverse bar to provide a balance assembly.

The individualized U-shaped spring frame sections, each supporting a tubular shaft on which a row of massage applicators individually and freely rotate, are flexibly responsive to body pressure applied to the row of applicators by the tracking underside of the undulating body supporting cushion. As a result, the individualized rows of massage applicators flexibly and resiliently exert a predetermined uniform tracking pressure along the undulating inner surface of the cushion, as it conforms to the shape and form of the contoured body resting thereon.

The end portions of the gyratory motor suspension bar are fixed to the crown portions of a pair of longitudinally extending arch shaped springs of sinusoidal form, whose terminal ends are fixed to a carriage baseframe which includes a pair of parallel extending glider channels. The glider channels smoothly slide along a pair of longitudinally extending channel shaped tracks whose ends are adjustably secured to the cushion framework. The arch shaped supporting springs provide support flexibility for the gyratory motor suspension bar, which further enhances the uniformity in massage pressure which the several rows of resilient applicators transmit through the cushion and to the undulating body supported thereon.

It will be noted that the gyratory motor suspension bar, as supported by the longitudinally extending arch shaped springs, can tilt to the right or left longitudinally and transversely to a degree and in a direction which corresponds in degree and location to body pressure exerted against the resilient applicators. It will be further noted that the applicator supporting shafts are also responsive to body pressure since the individualized U-shaped spring sections which support the respective applicator shafts are both longitudinally and transversely flexible in response to body pressure exerted on the resilient applicators. These novel and distinctive features operatively cooperate to maintain each row of applicators in uniform pressure contact against the tracking undersurface of the framework cushion as it bows or undulates in response to body pressure. As a result, massage action of remarkably uniform intensity is applied to all undulating parts of the cushion supported body.

According to this invention, the tracking frame includes a pair of channel shaped guide rails of sturdy construction whose upper ends are secured to a transverse bar pivotally connected at the ends thereof to the side members of the cushion framework. The lower ends of these tracking rails are secured to angle brackets which are in turn adjustably secured to a transverse bottom member of the cushion framework. By simple adjustment of the tracking frame securing brackets, the resilient applicators supported by the traveling carriage may be brought into proper tracking position along the under surface of the body supporting cushion. The parallel glider channels, which form a part of the baseframe of the massage carriage, are designed to smoothly slide along the channel shaped tracks of the tracking assembly.

To insure smooth, noiseless and substantially frictionless sliding movement of the carriage baseframe along the corresponding tracking rails, internal slider shoes are positioned within and at both ends of each glider channel, with the slider shoes slidably embracing laterally extending lips forming a part of the tracking rail over which the glider channel telescopes. To further insure smooth and vibration-free movement of the glider channel along its tracking channel, external slide shoes are also provided which are resiliently supported by the carriage baseframe and positioned to slide along the underside of the tracking channel. The slide shoes are all formed from a tough and wear-resistant plastic such as nylon or Teflon having a low friction coefficient, and provide the sole means of sliding contact between the glider channels of the carriage baseframe and the track forming channels of the tracking frame. All components of this traveling massager unit are thus made and assembled to insure smooth, noiseless and substantially frictionless sliding movement of the traveling carriage on the tracking assembly.

Reciprocating movement of the massage carriage is achieved in accordance with this invention by a driving motor which is rigidly supported on one of the angle-shaped brackets which adjustably secures the lower end of one of the tracking rails to the transverse frame member of the cushion framework. The driving motor rotates a chain sprocket through a speed reducer which drives one end of a continuous link chain extending along the underside of one of the tracking channels. The other end of the continuous drive chain is tautly trained around an idler sprocket journalled on a stub shaft adjustably secured to the same tracking rail. The sprocket supporting bearings are sturdily constructed and designed to maintain the drive chain in taut condition at all times.

An actuator bar is pivotally connected at one end thereof to one of the link pins of the drive chain, and its other end is pivotally connected to a bracket rigidly secured or welded to the carriage baseframe, such as the glider channel which travels along the tracking rail which supports the drive chain. A greatly simplified carriage reciprocating drive, which operates smoothly and substantially without friction, vibration or noise, is thus provided.

This improved massager may be factory assembled as a complete unit for convenient installation within the cushioned framework. The traveling massager unit is relatively simple in construction, is composed of relatively few parts, operates smoothly, quietly and efficiently, with maximum massage energy transmitted to the massage applicators, and minimum vibration transmission to the cushion framework.

Other objects and advantages of this invention will become apparent as this disclosure proceeds.

*Brief description of the drawings*

Although the characteristic features of this invention will be particularly pointed out in the claims, the invention itself, and the manner in which it may be carried out, may be better understood by referring to the following description taken in connection with the accompanying drawings forming a part hereof, in which:

FIG. 3 is a transverse section showing the massage carriage and carriage supporting structure installed in the upholstered backrest, and as the same would appear when viewed along line 3—3 of FIG. 1.

FIG. 5 is a longitudinal section showing further details of the massage carriage and a fragmentary part of one of the carriage supporting guide rails, as the same would appear when viewed along line 5—5 of FIG. 4.

FIG. 10 is a fragmentary end view of the massage carriage showing in greater detail the manner in which the end portions of the transverse motor suspension bar are secured to the crown portions of the arched supporting springs, the means for connecting the ends of the arched springs to the glider channels of the carriage baseframe, the internal slide shoes within the glider channels and the resiliently supported external slide shoes which insure smooth and vibration-free reciprocating movement of the carriage glider channels along the guide rails of the tracking frame, and the means for pivotally connecting the carriage reciprocating actuator bar to the carriage baseframe.

FIG. 10A is a section taken along line 10A—10A of FIG. 10, showing in greater detail the means used for rigidly clamping the end portion of the vibratory motor suspension bar to the crown portion of the arched supporting spring.

FIG. 11 is a fragmentary view taken along line 11—11 of FIG. 10 which shows in further detail the resilient means for supporting the external slide shoe in sliding abutment against the underface of the guide rail of the tracking frame.

FIG. 12 is another fragmentary view taken along line 12—12 of FIG. 11, and showing an end portion of the carriage baseframe, a cross section of one guide rail and the glider channel telescoped thereover, the internal slide shoes, the external slide shoe, and the resilient support for the external slide shoe.

FIG. 13 is a longitudinal section as viewed in the direction of the arrows 13—13 of FIG. 4, and showing in greater detail the improved mechanism for reciprocating the baseframe of the massage carriage along the guide tracks of the stationary tracking frame.

FIG. 14 is a sectional view taken along line 14—14 of FIG. 13, and showing the output shaft of the driving motor, the drive sprocket attached thereto, the shaft journal and journal support.

FIG. 15 is a sectional view taken along line 15—15 of FIG. 13, and showing the idler sprocket which supports the drive chain, the stub shaft on which it is journalled, and the means for securing the stub shaft to the guide rail of the tracking frame; and FIG. 16 is a sectional view taken along line 16—16 of FIG. 13, and showing the means for pivotally connecting one end of the actuator bar to one of the glider channels of the carriage baseframe which telescopes over a guide rail of the tracking frame.

Similar reference characters refer to similar parts throughout the several views of the drawings and specification.

*The preferred embodiment*

Figure 1:
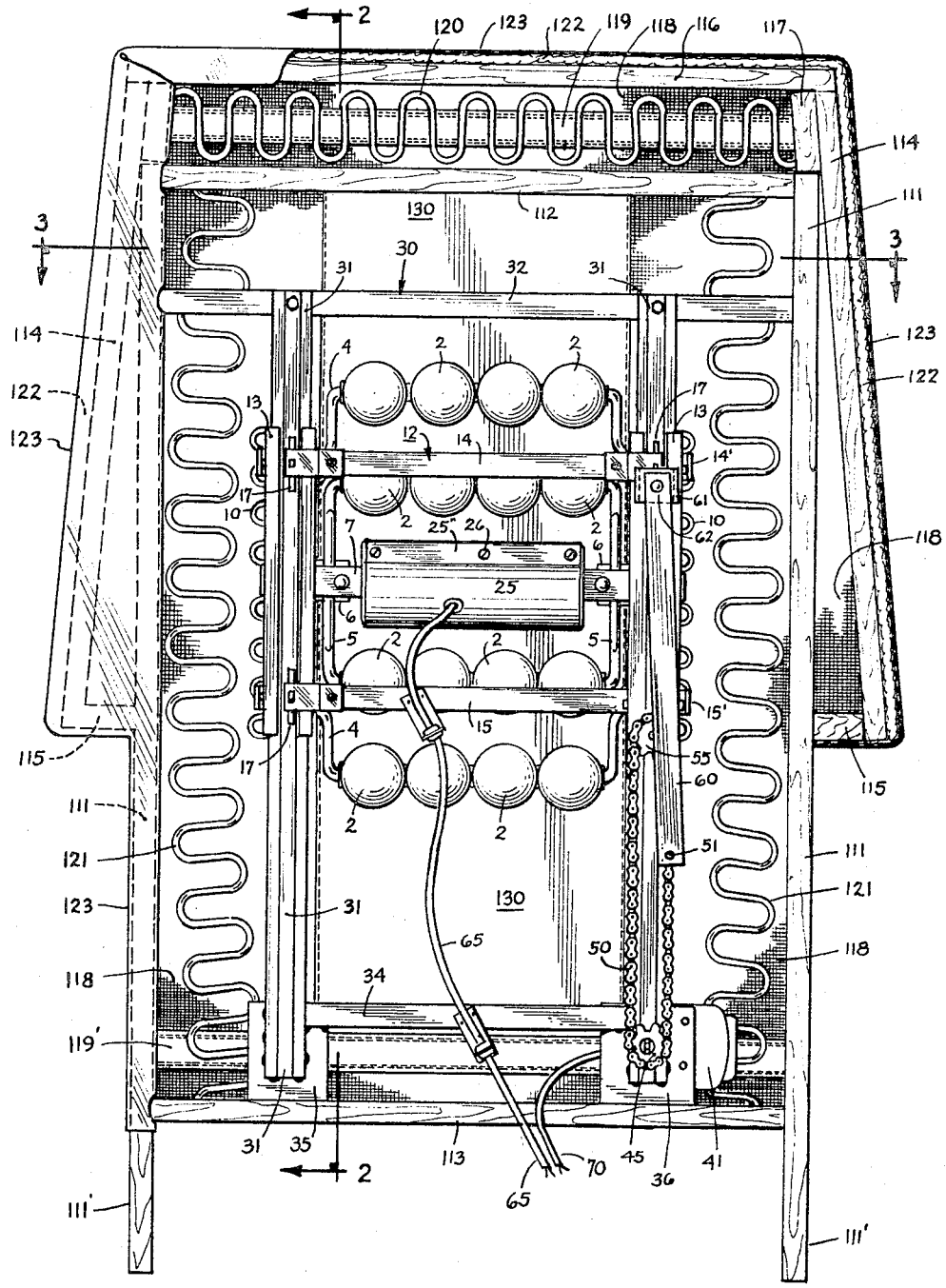
FIG. 1 is a rear elevational view of the reciprocating massage assembly made in accordance with this invention, and as it would appear when mounted in a cushioned framework, such as the upholstered backrest of a reclining chair; certain parts of the backrest upholstery being cut away to reveal structural details.

Referring to the drawings, the reciprocating gyratory massage assembly of this invention generally includes a massage carriage 1 which embraces a rigid baseframe 12 which supports the terminal ends of a pair of upwardly arching springs 10, arranged in spaced parallel relation and extending longitudinally of the carriage baseframe 12. A transverse bar 7 is connected at ends thereof to the crown portions of the spaced upwardly arching springs 10, and an air-cooled gyratory motor 20 is positioned between the arched springs 10 and removably cradled in a split tubular sleeve 25 rigidly suspended from the transverse bar 7.

One or more rows of resilient massage applicators 2 are rotatably supported on one or more spring frames whose side legs are rigidly secured in cantilever suspension to the vibratory motor suspension bar 7. In the preferred embodiment, an outer spring frame 4 of rectangular form and an inner spring frame 5 of rectangular form are provided, with the side legs 4a and 5a thereof medially secured to the transverse suspension bar 7. The end legs of the spring frames 4 and 5 are arranged in spaced parallel relation so that each end leg rotatably supports a row of resilient massage applicators 2 in resilient suspension.

The baseframe 12 of the massage carriage 1 is slidably and reciprocably supported on a pair of parallel and longitudinally extending guide rails 31 of a tracking frame 30. The tracking frame is designed to be adjustably secured to and within a cushion framework which supports the person's body. The massage carriage 1 is reciprocated at a controlled speed by reciprocating mechanism which includes a driving motor 40 which drives a continuous drive chain 50, supported by the tracking frame 30. An actuator bar 60 is pivotally connected at one end thereof to one of the chain links, and the other end of the actuator bar 60 is pivotally connected to the carriage baseframe 12.

Figure 6:
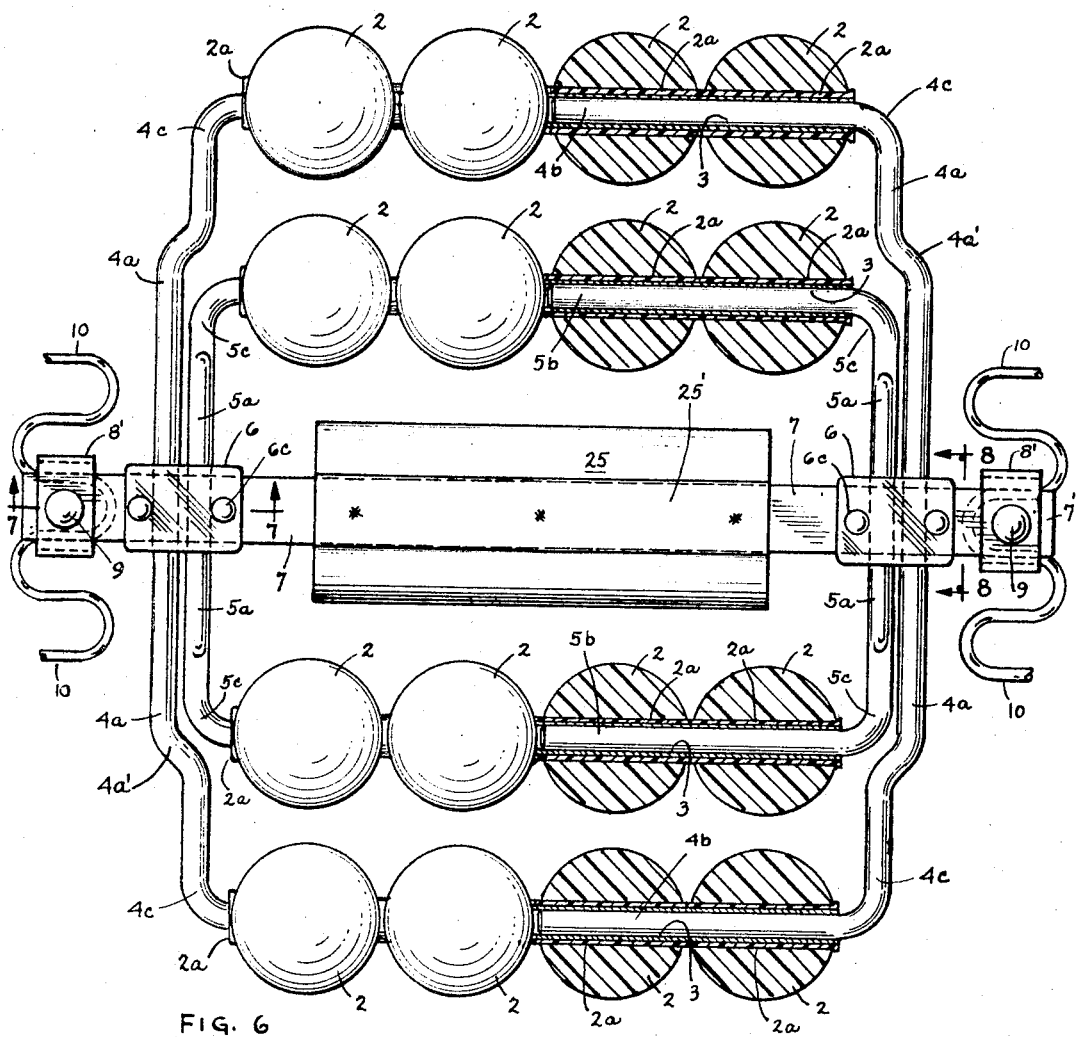
FIG. 6 is a fragmentary plan view of the massage carriage showing structural details of the flexible frames and resilient massage applicators rotatably journalled thereon, and the transverse gyratory motor suspension bar to which the side legs of the flexible frames are secured.

In the preferred embodiment shown in FIG. 6, four spaced and parallel rows of resilient massage applicators 2 are provided, each applicator being preferably made in the form of a soft rubber ball or roller of substantially circular cross-section. The two outer rows of massage applicators 2 are rotatably supported on tubular shafts 3 forming a part of the transversely extending end legs of an outer spring frame 4; and the two inner rows of massage applicators 2 are also rotatably supported on tubular shafts 3 forming a part of the transversely extending end legs of an inner spring frame 5 which is positioned within and in spaced relation to the outer spring frame 4.

The outer spring frame 4 can be advantageously formed and assembled from a complementary pair of U-shaped sections each presenting a longitudinally extending side leg 4a and a pair of transversely extending end leg portions 4b integrally joined to the side leg 4a by upwardly inclined corner portions 4c, as shown in FIGS. 3, 4, 5, 6 and 9. The inner spring frame 5 may also be advantageously formed from a complementary pair of U-shaped sections, each presenting a longitudinally extending side leg 5a and a pair of transversely extending end leg portions 5b, integrally joined to the side leg 5a by upwardly inclined corner portions 5c. The complementary U-shaped sections of the outer spring frame 4 and the inner spring frame 5 may each be made from a straight steel rod of appropriate length, which is bent into U-shaped form and then heat treated and tempered to produce a spring section of highly resilient characteristics.

Figure 9:
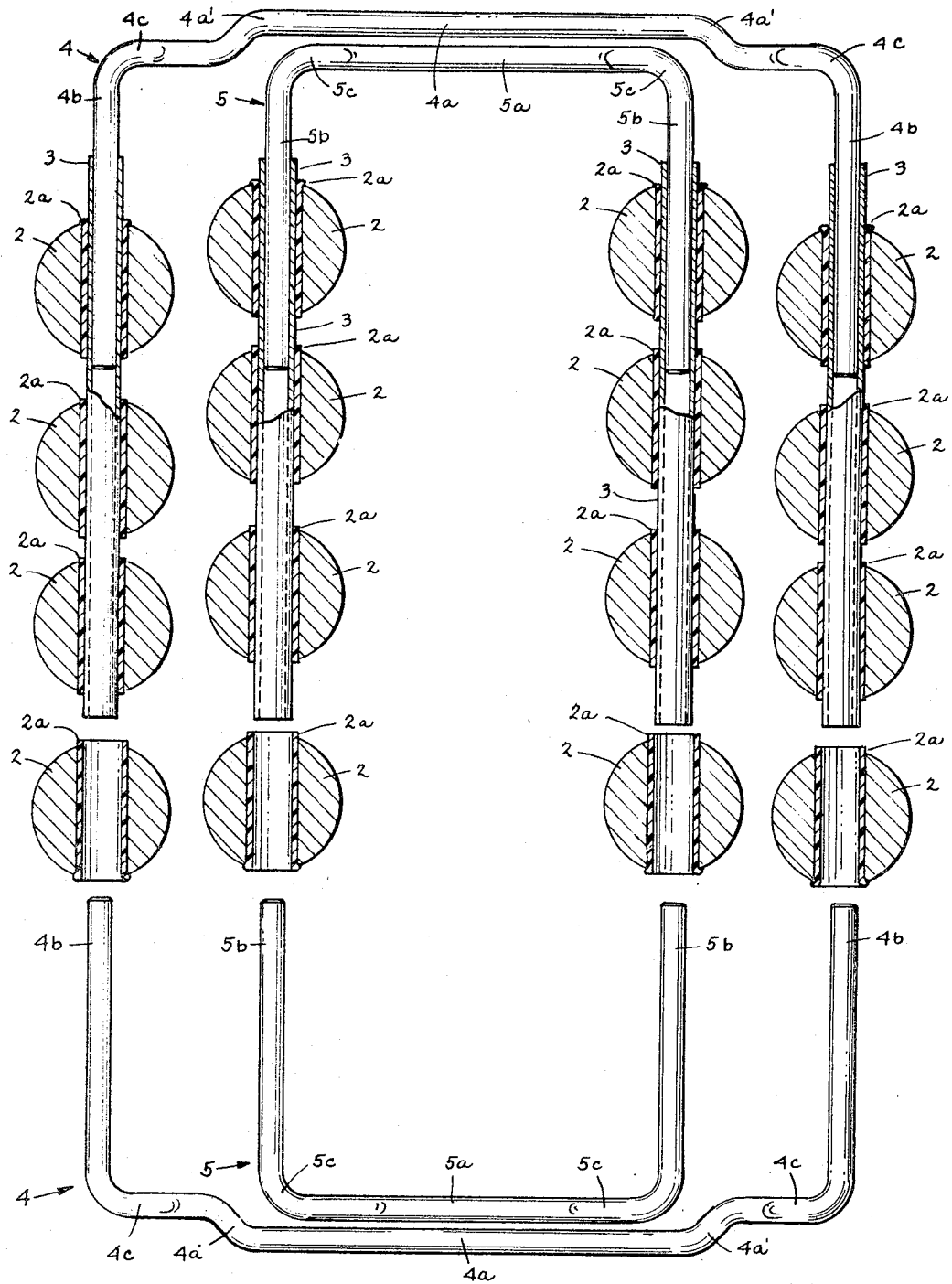
FIG. 9 is an exploded view, partly in section, which illustrates the manner in which the flexible frames and resilient applicators may be made and assembled into an operative unit.

Each massage applicator 2 has an axially extending bore into which a tubular bearing sleeve 2a is snugly inserted, and which is preferably formed from a metallic or plastic material having a low friction coefficient. As shown in FIGS. 6 and 9, the bearing sleeves 2a of a set of two, three, four or more massage applicators 2 are first telescoped over each of the four tubular shafts 3 in a manner so that each applicator 2 will freely and independently rotate thereon. The aligned end leg portions 4b of the complementary U shaped sections of the outer spring frame 4 can then be snugly telescoped and tightly fitted into the outer pair of applicator supporting shafts 3; and the aligned end leg portions 5b of the complementary U-shaped sections of the inner spring frame 5 are likewise snugly telescoped into the inner pair of applicator supporting shafts 3; thus completing the inner and outer spring frame assemblies as shown in FIGS. 6 and 9.

The inner spring frame 5 assembly is positioned within the outer spring frame assembly and their side legs 4a and 5a are medially secured to the transverse suspension bar 7 as shown in FIG. 6, with two rows of resilient massage applicators 2 positioned on opposite sides of the transverse suspension bar 7 in balanced arrangement. It will be noted by referring to FIGS. 6 and 9, that the side legs 4a—4a of the outer spring frame 4 each present offsets 4a'—4a' so that the outer end portions of the side legs 4a—4a are substantially in alignment with the end legs 5a—5a of the inner spring frame 5, with the respective resilient applicators rotatably supported in linear alignment.

Figure 7:
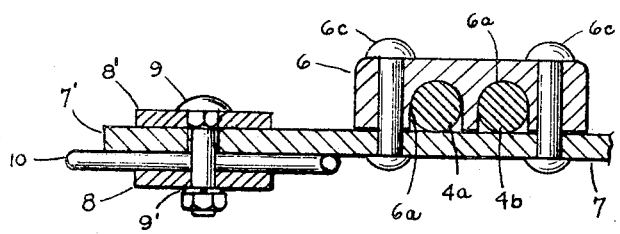
FIGS. 7 and 8 are enlarged fragmentary sections taken respectively along lines 7—7 and 8—8 of FIG. 6, and showing the means which may be used to rigidly secure the applicator supporting frames to the transverse suspension bar of the massage carriage.
Figure 8:
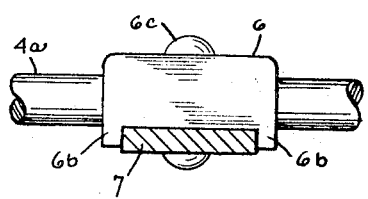

To insure maximum vibration transmission from the transverse suspension bar 7 to the rectangular spring frames 4 and 5 which rotatably support the applicators 2, the medial portions of the longitudinally extending side legs 4a and 5a thereof may be rigidly secured to the transverse suspension bar as by a pair of clamping blocks 6 which may be made of metallic material. Each clamp block 6 presents a pair of spaced semi-circular grooves 6a which snugly telescope over the midsections of the adjacent side legs 4a and 4b of the rectangular frames 4 and 5. Each clamp block 6 may be provided with a pair of depending guide lips 6b designed to snugly embrace the side edges of the transverse suspension bar 7 as shown in FIGS. 6, 7 and 8. Each clamp block 6 is rigidly secured by a pair of bolts or rivets 6c to the upperface of the suspension bar 7.

Alternatively, each of the side legs 4a and 4b of the rectangular spring frames 4 and 5 may be directly secured to the transverse suspension bar 7 by forming a pair of rivet receiving holes in the mid-section of each spring steel side leg 4a and 5a, with corresponding aligned holes in the steel suspension bar 7, and into which securing rivets are inserted and headed over against the underside of the transverse suspension bar 7.

The end portions 7' of the transverse suspension bar 7 are respectively rigidly secured to the crown portions of the arched springs 10 extending longitudinally and substantialy parallel to the side legs 4a and 5a of the outer and inner spring frames 4 and 5 which support the resilient massage applicators 2. Each of the arched supporting springs 10 can be advantageously formed from spring wire of sinusoidal form, as shown in FIGS. 2, 3, 4 and 5. Each end portion 7' of the suspension bar 7 seats firmly on the crown loop 10'' of the adjacent arched spring 10 and is clamped thereto by a pair of saddle shaped clamp plates 8 and 8' by a clamp bolt 9, as shown in FIGS. 10 and 10A. The lower clamp plate 8 seats against the underside of the crown loop 10'' and the companion clamp plate 8' seats on the upper face of the suspension bar 7; the ends of the clamp plates 8 and 8' tapering together to thereby snugly enclose the crown loop 10'' and suspension bar 7 and prevent the tapered ends from contact with the overlying cushion. The clamp bolt 9 extends through the upper clamp plate 8', the suspension bar 7, the crown loop 10'' and the lower clamp plate 8, with the bolt nut locked in tight position by a lock washer 9'.

The terminal end portions 10' of the arched springs 10 are secured to and supported by the carriage baseframe 12 which includes a pair of parallel glider channels 13 extending longitudinally thereof, and transversely extending upper and lower spacer bars 14 and 15 whose end portions are welded to the flat web portion 13' of the parallel glider channels 13. The web portion 13' of each glider channel 13 presents an integral end extension 11 at each end thereof which is rolled upwardly to snugly embrace the terminal end 10' of the arched springs, as shown in FIGS. 5 and 10. Each of the terminal end portions 10' of the arched springs 10 may be encased in a rubber sleeve 11' around which the end extension 11 of the glider channel 13 is snugly rolled, to provide a tight connection.

Massage vibrations are transmitted to the resilient massage applicators 2 by means of a vibration generating motor 20 whose outer casing is embraced by a split tubular sleeve 25 rigidly fixed to the transverse suspension bar 7 as shown in FIGS. 1, 3, 4 and 5. The vibration generating motor 20 is preferably a variable speed gyratory type motor having a predetermined mechanical unbalance, and generally includes a motor rotor rotating within a stationary motor stator encased within a cylindrical casing 22. The rotor shaft 21 is supported by a pair of self lubricating, self aligning and gyratory bearings mounted within the stator casing 22 in a manenr to permit gyratory movement of the motor shaft with minimum wear on the moving parts. An air circulating fan 23 is fixed to each of the projecting ends of the motor shaft 21. An unbalancing weight 24 is supported by a bolt 24' secured to the fan hub. Sufficient unbalancing weights 24 may be applied to each supporting bolt 24' to obtain the desired intensity of gyratory action.

The motor casing 22 is supported within the split tubular sleeve 25 by means of a pair of spaced resilient rings which embrace the motor casing 22 which are embraced by the split tubular sleeve 25. The ends of the split tubular sleeve 25 are closed by end covers 27 having air circulation holes therein. The split tubular sleeve 25 has a flattened offset portion 25' as shown in FIG. 5 which is rigidly secured as by screws or welds to the mid-section of the suspension bar 7.

The split tubular sleeve 25 presents spaced and laterally extending flange portions 25", connected by two or more clamp bolts 26 conveniently positioned with respect to the transverse suspension bar 7, as shown in FIG. 5. The clamp bolts 26 provide convenient and accessible means for firmly clamping the split tubular sleeve 25 in embracing relation around the resilient rings which surround the stationary motor casing 22, and also permit convenient removal and replacement of the gyratory motor for inspection and repair, when the clamp bolts 26 are removed and the split tubular sleeve is expanded. The removable end covers 27 are frictionally held in position within the ends of the tubular sleeve 25 when the clamp bolts 26 are tightened; and when the clamp bolts 26 are loosened, the perforated end covers 27 can readily be removed.

The vibrations produced by the gyratory motor 20 are transmitted through its motor casing 22 to the split tubular sleeve 25 which tightly embraces the same. The motor generated vibrations are transmitted by the tightened tubular sleeve 25 to the transverse suspension bar 7, and then to the rectangular shaped inner and outer spring frames 4 and 5 and to the resilient massage applicators 2 supported thereon.

The massage carriage 1 is so constructed and mounted that the several rows of resilient massage applicators 2 will be in contact with the inner face of a tough and flexible liner sheet 130 forming the inner layer of resilient padding whose outer face is encased within upholstery covering 128. When body weight is exerted against the resilient cushion, the flexible liner sheet 130 will sag into pressure contact against the several rows of resilient massage applicators 2 of the massage carriage. The arched supporting springs 10 resiliently maintain the rows of resilient massage applicators 2 in pressure contact with the flexible liner sheet 130 when body pressure is exerted thereagainst through the resilient padding and upholstery covering. The arched supporting springs 10 also permit the resilient side legs 4a and 5a of the rectangular spring frames 4 and 5 to flexibly tilt in response to body pressure transmitted to the resilient massage applicators 2, so that the several rows of massage applicators will exert uniform pressure agaist the inner liner sheet 130 of the upholstery.

Since the rectangular shaped outer and inner applicator supporting frames 4 and 5 are made of spring steel, the complementary side legs 4a and 5a thereof will also flex in response to undulating body pressure, thereby further enhancing the uniformity of contact pressure exerted by the several rows of resilient massage applicators against the flexible liner sheet 130 of the body supporting cushion.

The massage carriage baseframe 12 is reciprocably supported on the pair of parallel and longitudinally extending guide rails 31 of the tracking frame 30, as shown in FIGS. 1, 2, 4, 5, 10, 12 and 13. The guide rails 31 may be formed of steel or other rigid material, and may be generally channel shaped in cross section and present laterally flared guide lips 31'. The longitudinally extending guide rails 31 telescopically receive the glider channels 13 of the carriage baseframe 12 and provide sliding support therefor.

Each glider channel 13 presents a relatively flat web portion 13' designed to telescope over the concave upperface of its associated guide rail 31; rounded side edge portions 13" designed to loosely embrace the lateral guide lips 31' of the guide rail; and inturned flanges 13''' designed to loosely overlap the underface of the lateral lips 31', as shown in FIGS. 5, 10 and 12. Smooth, vibration free, and substantially frictionless telescoping movement of each glider channel 13 over its guide track 31 is insured by the provision of a pair of internal slide shoes 16 positioned within and adjacent to each end of the glider channel 13 as shown more particularly in FIG. 12.

Each internal slide shoe 16 may be composed of a plastic material having a low coefficient of friction such as Teflon, Delrin or nylon, and presents a rounded body section 16' and resiliently flared leg sections 16" which embrace the outer edge and the opposite sides of the adjacent guide lip 31' of the associated guide track 31. Each slide shoe 16 fits within the pocket formed by the flat web portion 13', rounded edge portion 13", and inturned flange portion 13''' of the glider channel. Each slide shoe 16 is maintained in fixed position within the glider channel 13 by a lug 16''', integral with and projecting laterally from the rounded body portion 16' of the slide shoe, and which lug 16''' projects through a conforming hole formed in the rounded edge portion 13" of the glider channel 13. The glider channel 13 and four slide shoes 16 assembled therein are telescoped over its associated guide rail 31 before the rails 31 are connected together to form the tracking frame 30.

The ends of the spacer bars 14 and 15 of the carriage baseframe 12 may be formed to provide bent lug portions 14'–15' which engage the projecting lug 16''' of the adjacent slide shoe 16 and thereby maintain the inner faces of the slide shoes 16 in firm sliding engagement with the guide lips 31' of the guide rail 31, as shown in FIGS. 10 and 12.

To further insure smooth and noiseless sliding movement of the carriage glider channels 13 along the stationary guide rails 31, one or more external slide shoes 17 are resiliently supported from the carriage baseframe 12 and positioned to slide along the underface of the adjacent guide track 31, as shown in FIGS. 1, 5, 10, 11, 12 and 13. The external slide shoe 17 may be composed of a plastic material having a low friction coefficient, and may be generally similar in length and cross section to the similar internal slide shoes 16. Each external shoe 17 has a U-shaped body section 17' presenting resiliently flared leg sections 17" whose smooth terminal ends are positioned to slide along the underface of the guide track 31.

The external slide shoes 17 are resiliently supported from the transverse spacer bars 14 and 15 of the carriage baseframe 12 by individual leaf spring 18 which is secured to the adjacent spacer bar 14–15 by a bolt 19 whose nut is locked by a lock washer 19'. As shown more particularly in FIGS. 10, 11 and 12, each leaf spring 18 presents a downwardly inclined spring arm 18' which terminates in a laterally projecting lip portion 18". The lip portion 18″ has a hole formed therein which snugly receives a lug 17‴ integral with and projecting from the base section 17′ of the external slide shoe 17. The lip extension 18″ of the supporting bracket provides a resilient seat for the basesection 17 of the external slide shoe 17, and serves to maintain the smooth terminal ends of the flared shoe legs 17″ in resilient sliding contact against the underface of the guide track 31.

By the provision of slide shoes 16 positioned within the glider channel 13, and external slide shoes 17 resiliently supported from the spacer bars 14–15 of the carriage baseframe 12, the carriage baseframe will slide and reciprocate on the paired guide tracks 31 smoothly, noiselessly and substantially without friction or vibration.

Figure 2:
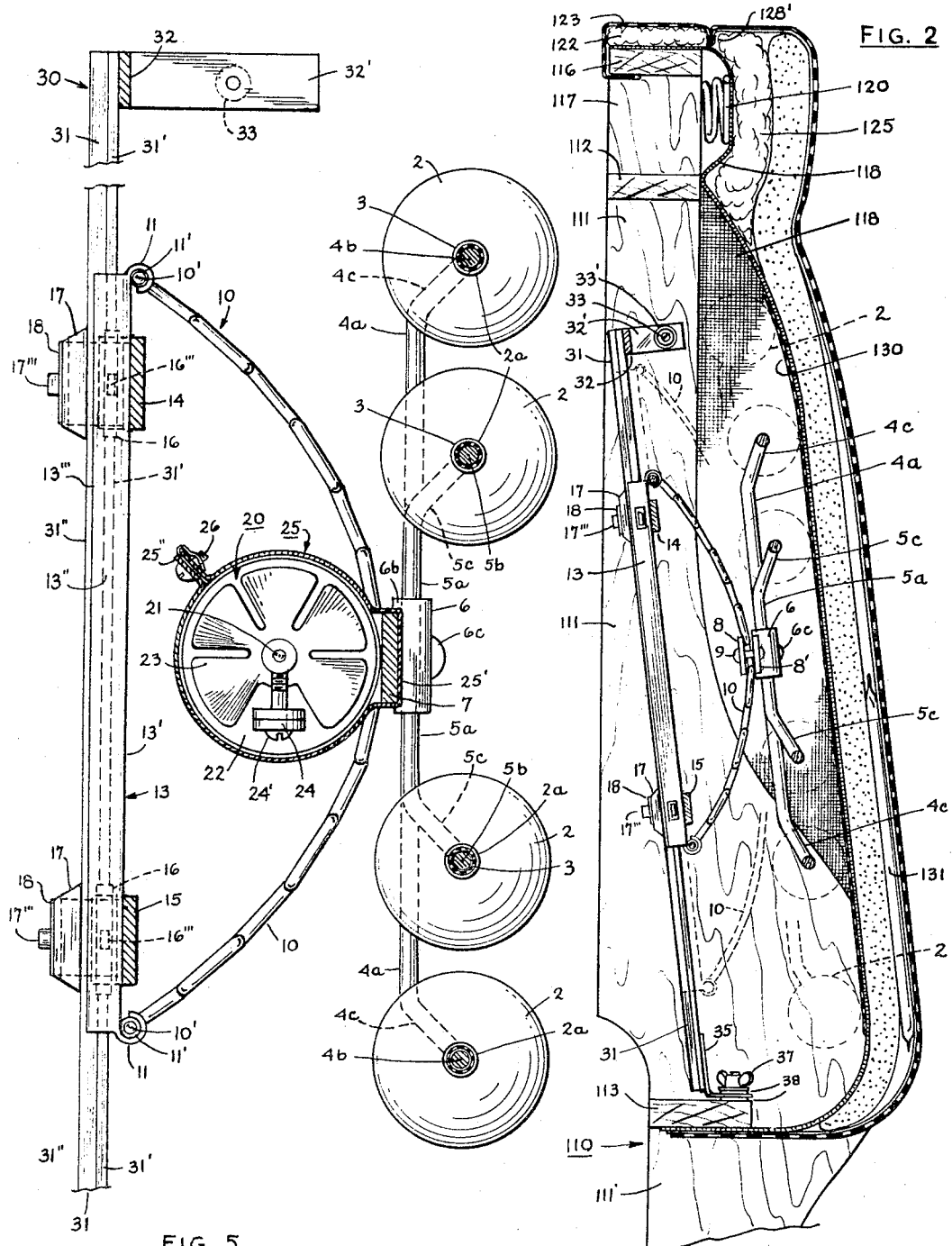
FIG. 2 is a longitudinal section taken along line 2—2 of FIG. 1, and showing parts of the massage carriage and carriage supporting structure as it would appear when installed in the upholstered backrest; this view also indicating in phantom lines the length of travel of the massage carriage when reciprocated.
Figure 4:
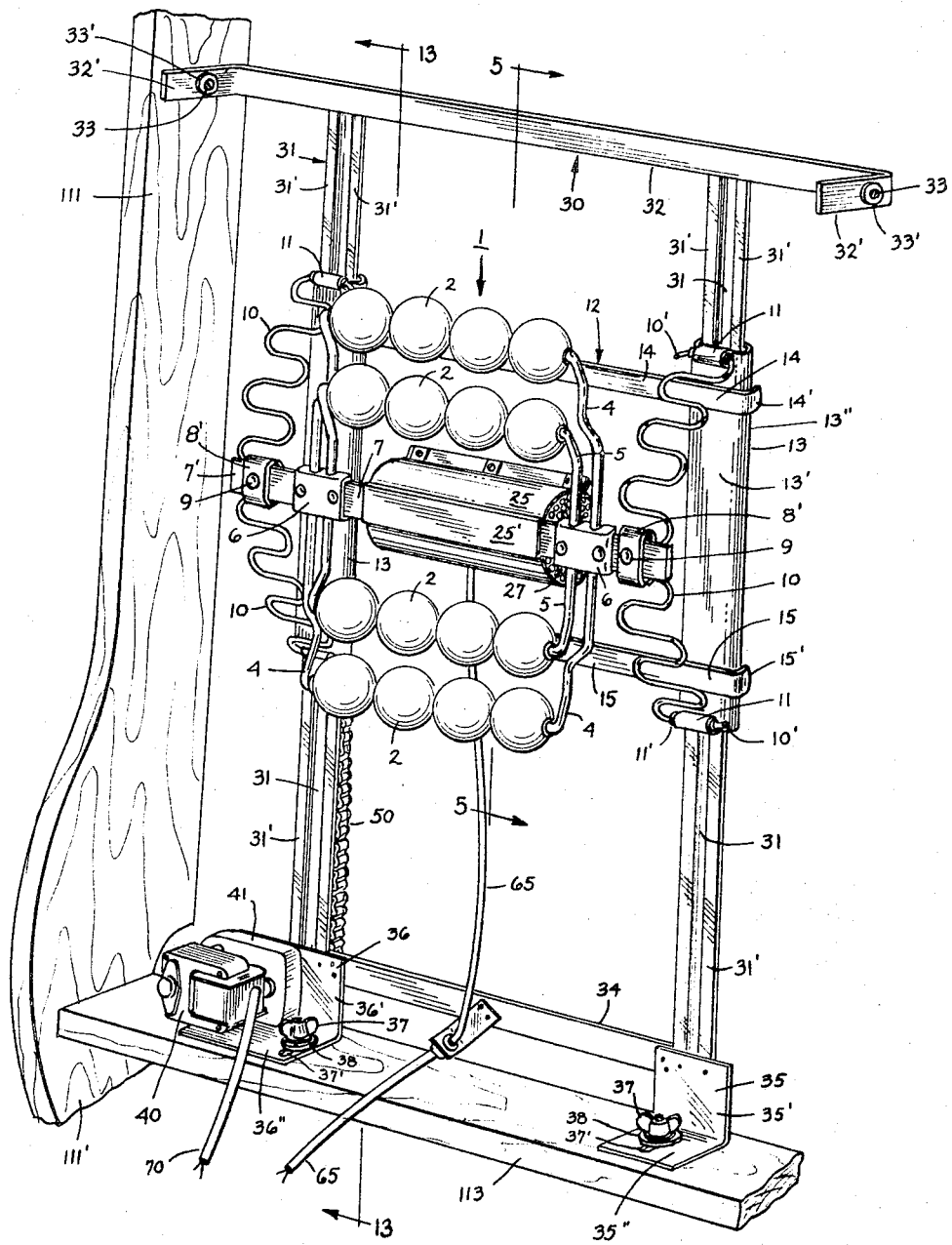
FIG. 4 is a front elevational view of the assembled reciprocating massage unit which includes, the massage carriage, the carriage supporting tracking frame and carriage reciprocating mechanism; only fragmentary parts of the cushion framework being here shown.

The guide rails 31 forming a part of the tracking frame 30 are rigidly joined in parallel relation at the adjacent ends thereof by a transverse upper bar 32 and a transverse lower bar 34, as shown in FIGS. 1, 2, 3, 4, 5 and 13. The transverse upper bar 32 may be designed to be pivotally supported from the side members of the cushion framework, and for this purpose may be provided with end legs 32′ which are secured by pivot bolts 33 to side members of the cushion framework, as shown in FIG. 4. Each end leg 32′ may be faced with rubber washers 33′ on both sides thereof and through which the pivot bolt 33 extends, as shown in FIGS. 2, 4, 5 and 13. The lower ends of the guide tracks 31 are supported from a transverse member of the cushion framework by a pair of angle brackets 35 and 36 having corresponding legs 35′ and 36′ which are welded to the adjacent ends of the guide rails 31 and to the ends of the lower transverse bar 34, and the other legs 35″ and 36″ of the angle brackets are adjustably secured by wing bolts 37 to a transverse member of the cushion framework. Both sides of the securing legs 35″ and 36″ of the angle brackets 35 and 36 may be faced with rubber washers 38 through which the wing bolts 37 extend, as shown in FIGS. 2, 4 and 13.

The mechanism for reciprocating the massage carriage 1 may be mounted on the tracking frame 30 to provide a complete traveling massage unit, ready for installation in the cushion framework. As shown in FIGS. 1, 4 and 13, the driving motor 40 is preferably of the variable speed type which is fan cooled and contained within a removable ventilated housing 40′. A speed reducing train is contained within an adjacent gear box 41. The motor and gear train unit is secured by spacer legs 41′ and associated bolts to the guide-track-attached leg 36′ of the angle bracket 36. The drive shaft 42 from the gear train extends through the bracket leg 36′ and the bottom wall 31″ of the channel shaped guide track 31 secured thereto, as shown in FIGS. 13 and 14.

A driving sprocket 45 is secured to the projecting end of the drive shaft 42 and in spaced relation to the bottom wall 31″ of the guide track 31 with which it is associated. A continuous drive chain 50, composed of a series of flexible links, is trained around the drive sprocket 45, and its opposite looped end is trained around an idler sprocket 55 positioned adjacent the bottom wall 31″ of the guide track 31. The idler sprocket 55 is journalled on a stub shaft 56 secured in the bottom wall 31″ of the guide track 31.

Reciprocating motion is transmitted by the drive chain 45 to the baseframe 12 of the massage carriage by an actuator bar 60. One end of the actuator bar is pivotally connected to one of the chain links, and the other end is pivotally connected by a bearing stud 62 to the web section of a U-shaped bracket 61 whose legs are welded to the inturned flanges 13‴ of the baseframe glider channel 13 which reciprocates on the guide track 31 along which the drive chain 50 extends.

To provide a strong and sturdy support bearing for the motor drive shaft 42, a cylindrical shaft reinforcing collar 43 snugly telescopes over the body portion 42′ of the drive shaft 42, as shown in FIG. 14, and thus forms a substantial cross-sectional enlargement of the shaft body section 42′ and rotates therewith. The inner end of the shaft collar 43 projects through the bottom wall 31″ of the guide rail 31 and through a conforming hole in the shaft supporting leg 36′ of the angle bracket 36. A retainer ring 44 is set into a circular groove formed around the inner end of the shaft reinforcing collar 43, and which rotatably abuts the adjacent face of the bracket leg 36′. The body section 43′ of the shaft collar 43 is journalled in a stationary sleeve 46 which is externally welded to a tapered flange formation 47 punched from the bottom wall 31″ of the channel shaped guide rail 31, and thereby providing a strong and sturdy journal in which the body section 43′ of the shaft enlarging collar 43 rotates.

The outer end section 43″ of the shaft reinforcing collar 43 is provided with a transverse slot into which the flattened end portion 42″ of the drive shaft 42 is snugly fitted and which locks the shaft enlarging collar 43 to the drive shaft 42. The chain driving sprocket 45 is welded or sweated to the cylindrical end section 43″ of the shaft reinforcing collar 43, and the hub portion 45′ of the drive sprocket abuts an external rim 43‴ which forms an integral part of the shaft reinforcing collar 43. A strong and sturdy bearing support is thus provided which maintains the drive sprocket 45 in precise chain driving position.

The idler sprocket 55 supports the other end of the continuous drive chain 50 and its hub portion 55′ is rotatably journalled on a stationary stub shaft 56 as shown in FIGS. 13 and 15. The stub shaft 56 presents a flared bottom rim 56′ whose inner face abuts against the bottom wall 31″ of the channel shaped guide rail 31. The sprocket hub 55′ rotatably abuts the opposite face of the flared rim 56′ so that the flared rim 56′ correctly fixes the operating position of the idler sprocket. The drive sprocket 55 is further maintained in correct operative position by a clamp ring 57 which is set within a circumferential groove in the stub shaft 56 and abuts the opposite face of the sprocket hub 55′ without interfering with the free rotation thereof. The inner end of the stub shaft 56 is firmly secured to the bottom wall 31″ of the guide rail 31 by a bolt 58 whose shank 58′ extends through an elongated slot 59 in the bottom wall 31″ of the guide track 31 and is threaded into a socket hole formed in the stub shaft 56. The bolt 58 has an enlarged locking head 58″ which tightly seats against the inner face of the bottom wall 31″ of the guide track 31. Before the lock bolt 58 is tightened, a spreader tool is positioned between the journalling sleeve 46 of the drive sprocket 45 and the stub shaft 56 of the idler sprocket 55 to draw the drive chain 50 taut, and the lock bolt 55 is then tightened.

The bearing assembly which rotatably supports the drive sprocket 45 and the bearing assembly which supports the idler sprocket 55 are thus made and assembled to unyieldingly support the drive chain 50 in taut condition at all times from one of the guide rails 31 of the tracking frame 30. The chain and sprocket supporting guide rail 31 can be made strong, rigid and unyielding due to its channel shape. It will be appreciated however that a third rail of similar channel shape and form, may be positioned between the carriage baseframe supporting guide rails 31—31, and on which medial rail the driving motor 40 and its gear box 41, the drive sprocket 45 and its bearing assembly, the idler sprocket 55 and its bearing assembly may be mounted, in the same manner as above described, without departing from the spirit of this invention.

The continuous drive chain 50 operatively reciprocates an actuator bar 60 which transmits reciprocating movement to the baseframe 12 of the massage carriage 1. As shown in FIG. 13, any selected link of the continuous drive chain 50 may be provided with an elongated link pin 51 to which one end 60′ of the rigid actuator bar 60 is pivotally connected. A spacer collar 52 is telescoped over the projecting end extension of the link pin 51 and serves the triple purpose of reinforcing and strengthening the link pin extension, provides a flat seat for the end portion of the actuator bar 60, and spaces the actuator bar from the continuous drive chain so that chain movement is not interfered with. The outer end of the hinge pin extension 51 may be provided with a flared flange to maintain the end portion 60' of the actuator bar pivotally connected thereto. If desired, a journalling sleeve of self-lubricating material may be positioned within the journalling bore in the end portion 60' of the actuator bar to reduce friction. The link pin extension 51 operates to reciprocate the rigid actuator bar 60 for a distance corresponding to the loop length of the continuous drive chain 50 which is selected and employed and the actuator bar 60 will operate to reciprocate the baseframe 12 of the massage carriage over a corresponding tracking distance.

The opposite end 60' of the actuator bar 60 may be pivotally connected to that glider channel 13 of the carriage baseframe which telescopes over that guide rail 31 which supports the drive chain 50. This pivotal connection may be made as shown in FIGS. 13 and 16 and comprises a U-shaped bracket 61 whose legs 61' are rigidly welded to the outer face of the inturned flanges 13''' of the glider channel 13. The U-shaped pivot bracket 61 has an over-all height, when pivotally connected to the end portion 60'' of the actuator bar 60, which will maintain the actuator bar in spaced and substantially parallel relation to the glider channel 13 to which it is attached, and the guide track 31 over which the glider channel telescopes.

The end portion 60'' of the actuator bar 60 is provided with a journalling bore which is journalled on the cylindrical body section 62' of a cap stud 62. The cap stud 62 has a reduced diameter body section 62'' which extends through a conforming hole in the web section 61'' of the U-shaped bracket 61, and is then headed over against the innerface of the web portion 61'' to firmly secure the nonrotating cap stud 61 thereto. The cap stud 62 has an enlarged head portion 62''', and a spring washer 63 is positioned between the stud head and the outer face of the actuator bar 60 to provide a smoothly operating and noiseless pivotal connection.

The upper and lower transverse spacer bars 14 and 15, whose end portions are welded to the web portions 13' of the paired guiding channels 13 provide a baseframe 12 of rigid construction, which rigidly maintains its rectangular shape and insures smooth sliding movement of the gliding channels 13 along the guide rails 31 of the tracking frame 30. Smooth vibration free and noiseless sliding movement of the carriage baseframe on the guide tracks 31 is further assured by the provision of the internal slide shoes 16 and the external slide shoes 17 as heretofore described.

It will be appreciated that the U-shaped pivot bracket 61 may also be welded to the upper transverse spacer bar 14 of the carriage baseframe 12, with the carriage driving end of the actuator bar 60 pivotally connected thereto as by the cap stud 62 as heretofore described. In such a modification, a third channel shaped rail, positioned medially between and similar in construction to the paired guide rails 31–37, may be provided to support the drive chain 50, driving sprocket 45, idler sprocket 55, and their bearing units as heretofore described. In such case, the third or medial rail may be secured at the ends thereof to the mid-sections of the upper transverse pivot bar 32 and the lower transverse spacer bar 34 of the tracking frame 30 as heretofore described, with the driving motor 40 and its associated gear train box 41 suitably secured to the transverse spacer bar 34 and/or the adjacent end of the medial or third rail. Such alternate driving assembly would remove any warpage strain on the carriage baseframe 12 at slightly additional cost in manufacturing labor and material.

The massage carriage 1, associated tracking frame 30 and reciprocating mechanism are designed for convenient installation as a fully assembled unit within the body supporting framework of various forms of cushioned furniture, such as a massage table, couch, bed or the upholstered backrest of a reclining chair. For purposes of illustration, but not by way of limitation, FIGS. 1, 2 and 3 show the massage unit of this invention installed in the backrest framework 110 of a reclining chair, and which embraces a cushion framework which includes a pair of similar longitudinally extending and substantially parallel frame members 111 joined by an upper transverse frame member 112 and a lower transverse frame member 113. The longitudinally extending frame members 111 are generally shaped as shown in FIGS. 1, 2 and 4, and present lower extensions 111' projecting below the lower transverse frame member 113 to accommodate the reclining mechanism attached thereto.

To supply artistic form to the upholstered backrest, a pair of secondary longitudinal frame members 114 are provided which are positioned exteriorly of and at an upwardly inclined angle with respect to the inner parallel frame members 111. The lower ends of the outer secondary frame members 114 are secured to the adjacent inner side frame members 111 by transverse spacer blocks 115 which serve to provide a flared hip formation at the sides of the upholstered backrest which extend over the upper rear ends of the seat side sections. The upper ends of the outer inclined side frame members 114 are joined by a transverse top frame member 116 which is vertically spaced from the upper transverse frame member 112. Upper spacer blocks 117 may also be inserted between the transverse top frame member 116 and the transverse upper frame member 112 positioned therebelow, to rigidify the headrest section of the backrest framework.

A strong but flexible fabric 118 such as strong burlap fabric, is firmly secured along its longitudinal and transverse edges to the inner faces of the top and bottom transverse frame members 116 and 113, to the inner side frame members 111, and to the outer side frame members 114 and spacer blocks 115 and 117, as shown in FIGS. 1, 2 and 3. The flexible fabric 118 forms the inner layer of the upholstery which encases the backrest framework. To reinforce the flexible fabric 118, a transverse strip of upholstery webbing 119 extends between and is secured to the upper spacer blocks 117 of the headrest. A corresponding lower transverse webbing strip 119' may also extend between and be secured to the inner parallel side frame members 111 directly above the lower transverse frame member 113 of the main backrest section as shown in FIG. 1.

That portion of the inner fabric 118 which forms a part of the headrest upholstery is supported by a transversely extending sinusoidal spring 120 which is positioned between the transverse frame members 112 and 116, and whose ends are secured to the spacer blocks 117 as shown in FIG. 1. A pair of longitudinally extending sinusoidal springs 121, positioned inwardly of and generally parallel to the adjacent inner side frame members 111, supply shape and form to the main backrest section and support the side portions of the inner fabric 118, as shown in FIGS. 1 and 3. The upper and lower ends of the longitudinally extending sinusoidal springs 121 are secured to the upper and lower transverse frame members 112 and 113. It will be noted that no sinusoidal or other springs, and no transverse webbing extend over the intermediate area of the main backrest section where the several rows of resilient massage applicators 2 are designed to travel.

A foam rubber strip 122 is wrapped around the outer surfaces of the lower spacer blocks 115, the outer inclined side frame members 114, and the uppermost transverse frame member 116. The foam rubber strip 122 is encased within a strip of upholstery covering 123 rigidly secured to the frame members by upholstery tacks or other means as shown in FIGS. 1, 2 and 3.

To give bulging form to the headrest section, a deep or thick strip of fibrous wadding or filler 125 is applied over that portion of the inner supporting fabric 118 which extends between the transverse upper frame members 116 and 112 and the upper end portions of the outer inclined side frame members 114, as shown in FIG. 2. To give bulging form to the side portions of the main backrest section, deep longitudinal strips of fibrous wadding or filler 126 are also applied to the outer side portions of the supporting fabric 118 as shown in FIG. 3 to give the cushioned side portions of the main backrest section the desired bulged contour.

The bulge forming headrest wadding strip 125, and the bulge forming side wadding strips 126, and also the intermediate unpadded area of the supporting fabric 118, is covered by a slab of sponge rubber 127 which is approximately one inch thick. The upper end of the resilient slab 127 extends over and embraces the headrest wadding strip 125 and overlaps the top transverse frame member 116 as shown in FIG. 2. The sides of the resilient slab 127 extend over and embrace the side wadding strips 126 and overlap the outer inclined side frame members 114 and lower spacer blocks 115 as shown in FIGS. 1, 2 and 3. The resilient slab 127 also extends down to the lower transverse frame member 113 and overlaps the lower portions of the side frame members 111 extending below the spacer blocks 115. As thus applied, the resilient slab 127 fully covers the transverse wadding strip 125, the side wadding strips 126, and also the intermediate area of the backrest extending between the upper and lower transverse frame members 112 and 113, where no wadding is applied. The sponge rubber slab 127 may be adhesively bonded at appropriate areas, but adhesive bonding of the sponge rubber slab is usually unnecessary, since it is maintained in its applied position by its friction surfaces and by the upholstery covering of the backrest.

The sponge rubber slab 127 is enclosed within upholstery covering 128 of any selected upholstery material, such as natural or artificial leather or upholstery fabric having any desired color and design in harmony with the upholstery covering applied to the chair base. The lower transverse edge portion of the upholstery covering 128 is secured to the underface of the lower transverse frame member 113 as shown in FIG. 2. The upper transverse edge portion of the upholstery covering 128, and the adjacent upper transverse edge portion of the upholstery strip 123, are inturned and secured together by stitching 128' as shown in FIG. 2. The side edge portions of the upholstery covering 128 are inturned and secured by stitching 128" to the corresponding inturned side edge portions of the upholstery strip 123 as shown in FIG. 3. The edge portions of the upholstery covering 128 and the upholstery strip 123 may be stitched together before application to the backrest framework, and when stitched together and applied to the backrest as above described, the sponge rubber slab 127, the fibrous filler strips 125 and 126, and the backrest frame structure are enclosed thereby, and leaving only the lower end extensions 111' of the backrest frame uncovered, as shown in FIG. 1.

Suitable tie buttons 129 as shown in FIG. 3 may be used to secure the upholstery covering 128 to the inner fabric 118 and thus serve to maintain the upholstery covering relatively taut and wrinkle free, give shape and form to the upholstery, and maintain the sponge rubber slab 127 and the fibrous wadding strips 125 and 126 in fixed position.

To enhance the therapeutic treatment of the chair occupant and to enhance the therapeutic value of the massage assembly, a heat pad 131 may be positioned between the fabric covering 128 and the sponge rubber slab 127 as shown in FIG. 2. The heat pad is positioned intermediately between the side wadding strips 126, and may have any desired longitudinal length to apply soothing heat to the whole or the lower part of the back area of the chair occupant. Since the heat pad 131 is supported and insulated by the sponge rubber slab 127, the heat generated by the heat pad does not enter the interior of the backrest, and its heat is reflected directly through the upholstery covering 128, with maximum heat transmission to the person's back. The heat pad 131 may be of standard construction, and contains loops of thermal wires whose temperature can be regulated by controlling the electrical current applied thereto. The loops of thermal wires are encased in suitable non-inflammable and heat transferring material, and fully enclosed within a sealed covering envelope.

To protect the inner fabric 118 forming a part of the backrest upholstery, from wear and excessive strain, a tough and flexible liner sheet 130 composed of strong and durable materials such as natural or artificial leather, is secured by stitching 130' to the inner fabric 118. The flexible liner sheet 130 extends transversely between the sinusodial springs 121 which extend longitudinally of the backrest section as shown in FIG. 5, and may have a longitudinal length extending from the top transverse frame member 116 to the lower transverse frame member 113 of the backrest framework as shown in FIG. 7.

The flexible liner sheet 130 provides a smooth inner surface with which the resilient massage applicators 2 are normally in contact, when the massage carriage is stationary or reciprocated. The upper and lower portions of the flexible liner sheet 130 and the inner fabric 118 which are beyond the reach of the reciprocating rows of massage applicators 2, are strengthened and reinforced by transversely extending textile upholstery webbing 119 and 119' as shown in FIG. 1. However, the area of the flexible liner sheet 130 which is traversed by the several rows of massage applicators 2, provides a smooth tracking surface therefor, free of traverse webbing, sinusoidal springs or other material which would produce undesirable irregularities in the tracking area of the liner sheet.

The rear face of the backrest may be covered by upholstery covering (not shown) which is detachable from the cushioned framework to normally enclose the traveling massage unit installed within and supported by the cushioned framework, but nevertheless accessible for adjustment or repair.

While the assembled traveling massager unit as shown in FIG. 4 is admirably adapted for insallation in the upholstered backrest of a reclining chair as above described, it is equally adapted for installation and association with any form of cushioned framework supported in any desired inclined or horizontal position; and wherein the cushioned framework essentially comprises a pair of longitudinally extending frame members 111—111 of any desired form or design and joined by one or more end frame members 112–113 to provide a rigid framework. The resilient cushion supported on the framework essentially comprises a resilient pad such as a sponge rubber slap 127 suitably supported from the rectangular framework, a covering 128 of flexible and long wearing material upon which the person's body rests, and an inner liner sheet 130 of tough and wear resistant material which provides a tracking surface along which the massage applicators 2 of the traveling massager unit are designed to roll.

To install the assembled traveling massager unit within the cushion framework, the end legs 32' of the tracking frame 30 are pivotally connected by pivot bolts 33 to the side frame members 111—111 of the cushion framework in a manner so that the adjacent outer row of massage applicators 2 are brought into rolling contact with the inner liner sheet 130 when no body pressure is exerted thereon, as indicated in FIG. 2. The opposite ends of the guide rails 31 of the tracking frame are also positioned so that the adjacent outer row of massage applicators 2 are positioned in rolling contact with the tracking liner sheet 130; and the guide rails 31 are then secured in this position by tightening the wing bolts 37 extended through slots 37' formed in the legs 35" and 36" of the rail supporting angle brackets 35 and 36.

While the tracking frame supporting angle brackets 35 and 36 are shown in FIGS. 1, 4 and 5 are welded to the adjacent ends of the guide rails 31—31 and secured by the wing bolts 37 to the adjacent transverse frame member 113 of the cushioned framework, it will be appreciated that the angle brackets 35 and 36 can be alternately welded to extended end portions of the transverse spacer bar 34 of the tracking frame and adjustably secured as by the adjustable wing bolts 37 to the side frame members 111—111 of the cushioned framework.

The tracking frame 30 and its associated reciprocating mechanism may be made to slidably support and drive the massage carriage 1 for any desired distance by making the guide rails 31—31 of the tracking frame 30 of appropriate length and providing a continuous drive chain 50 of corresponding loop length. Thus the traveling massager unit may be proportioned and designed to effectuate therapeutic massage along the entire length of the body, as when the cushioned framework forms a part of a massage table; or the massage unit may be designed to massage the length of the torso from the neck or shoulder area to the person's buttocks, as when it is installed in the cushioned backrest of a reclining chair, as shown in FIG. 2.

Electrical power to operate the vibration producing motor 20 may be supplied by a power cable 65, and power to operate the motor 40 which reciprocates the massage carriage 1 may be supplied by a secondary power cable 70 as shown in FIG. 4. A power cable to energize the heat pad 131 would also be provided for. Electrical circuits and conveniently located controls, as shown for example in copending U.S. application Ser. No. 451,605, are also provided; to regulate and control the degree of heat given off by the heat pad 131, to regulate and control the operation and rotated speed of the vibratory motor 20 and the frequency and the intensity of the massage action applied to the body under treatment; and to regulate and control the driving motor 40, and the speed of travel of the massage carriage, or to hold the massage carriage stationary at any desired location when stationary massage is to be applied to a selected area of the body.

When the traveling massager unit of this invention has been properly installed in the cushioned framework, with all rows of massage applicators 2 in contact with the tracking liner sheet 130 of the cushion when not loaded by a person's body, the massage carriage will then flexibly respond to body pressure and the undulating sag of the cushion in accordance with body contours, and so that vibratory massage of uniform intensity is delivered by all four rows of massage applicators 2 to the cushion supported body for the entire length of travel of the massage carriage. Resilient flexure in vertical, longitudinal and transverse directions, with resultant uniformity in intensity of massage application, is uniquely accomplished by the interrelated cooperation of a number of instrumentalities embraced by the massage carriage.

For example, the sinusoidal upwardly arched springs 10—10 will independently flex in vertical, longitudinal and transverse directions in accordance with the degree and location of body pressure applied to the massage applicators 2. The transverse motor suspension bar 7, supported by the arched springs 10—10, can also tilt in a lengthwise direction as well as a transverse direction in accordance with the location and intensity of the body pressure exerted on the several rows of massage applicators 2. Also, the resilient side legs 4a and 5a of the inner and outer applicator supporting springs 4 and 5, medially secured to the transverse suspension bar 7 in cantilever suspension, will tilt and flex in accordance with body pressure exerted on the individual applicators 2. The massage applicators 2 themselves are also highly resilient, since they are formed from a sponge type rubber surfaced with a tough and wear resistant outer skin.

The applicator supporting spring frames 4 and 5 may be considered as composed of a pair of U-shaped sections each comprising a pair of side leg portions secured in cantilever suspension to the vibratory motor supporting bar 7, and a connecting web section on which the resilient massage applicators 2 are rotatably supported. The upwardly inclined corner portions 4c and 5c of the spring frames 4 and 5 raise the several rows of massage applicators 2 to an unobstructed traveling position, and present smooth corners which are spaced from the tracking liner sheet 130 during travel of the massage carriage.

Traveling massager assemblies constructed in accordance with this invention, and installed in a body supporting cushioned framework as above described, deliver restful, relaxing and soothing massage of uniform intensity to all areas of the person's body over which the massage carriage is driven. This traveling massager unit is substantially noiseless in operation, travels smoothly and silently, is relatively light in weight, and flexibly adjusts to the pressure applied thereto by the undulating body. This traveling massager unit is assembled from relatively few parts, can be mass produced at an economical cost, and can be quickly installed in any desired body supporting cushion framework for which its tracking frame is designed.

While certain novel features of this invention have been disclosed herein and are pointed out in the claims, it will be understood that various omissions, substitutions, and changes may be made by those skilled in the art without departing from the spirit of this invention.

I claim:

1. A massage carriage operative to apply therapeutic massage to a cushion supported body, which includes; a carriage baseframe, a pair of arched springs arranged in parallel relation and extending longitudinally of the baseframe, means for securing the ends of the arched springs to the baseframe, a suspension bar extending transversely between and secured at the ends thereof to the crown portions of said arched springs, a vibration producing motor connected to said suspension bar and extending between said arched springs, a spring frame of U-shaped form presenting a web portion spaced from and extending substantially parallel to said suspension bar, said web portion terminating in rounded corner portions which merge smoothly into a pair of flexible leg portions rigidly secured in cantilever suspension to said suspension bar, and a row of resilient massage applicators freely rotatable on the web portion of said U-shaped frame for tracking contact with the underface of the body supporting cushion; said arched springs and spring frame being flexible in both longitudinal and transverse directions and resiliently responsive to the degree of pressure exerted on the resilient applicators by the undulating body supporting cushion.

2. A message carriage as defined in claim 1, and wherein said arched supporting springs are composed of spring wire of sinusoidal form and which are flexibly responsive to body pressure exerted against the resilient massage applicators.

3. A massage carriage as defined in claim 1, and wherein each of said resilient massage applicators are generally circular in cross section and respectively embrace a tubular sleeve extending axially therethrough and rotatably journalled on the web portion of said spring frame.

4. A massage carriage as defined in claim 1, and wherein a pair of U-shaped spring frame sections are provided having the respective web portions thereof positioned on opposite sides of and extending substantially parallel to said suspension bar and having the leg portions thereof secured to said suspension bar in cantilever suspension, a tubular shaft embracing the web portion of each of said U-shaped frames, and a row of resilient massage applicators freely rotatable on each of said tubular shafts; the leg portions of said spring frames being resiliently flexible and respectively responsive to the pressure exerted on the resilient applicators supported thereby and with resultant application of massage action of substantially uniform intensity to correspondingly spaced parts of the cushion supported body.

5. A massage carriage operative to apply therapeutic massage to a cushion supported body, which includes; a carriage baseframe, a pair of arched springs arranged in parallel relation and extending longitudinally of the baseframe, means for securing the ends of the arched springs to the baseframe, a suspension bar extending transversely between and secured at the ends thereof to the crown portions of said arched springs, a vibration producing motor connected to said suspension bar and extending between said arched springs, a spring frame of generally rectangular form which presents a pair of substantially parallel and resiliently flexible side legs extending transversely of and medially secured to the end portions of said suspension bar, a pair of substantially parallel end legs extending on opposite sides of and in spaced and substantially parallel relation to said suspension bar, and smoothly rounded and upwardly inclined corner portions integrally joining said side legs to said end legs; and a row of resilient massage applicators rotatably supported on each of said end legs for tracking contact with the underface of the body supporting cushion; said arched springs and spring frame being flexible in both longitudinal and transverse directions and resiliently responsive to the degree of pressure exerted on the resilient applicators by the undulating body supporting cushion.

6. A massage carriage as defined in claim 5, and wherein a tubular shaft embraces each of the end legs of said rectangular spring frame, and a tubular sleeve extends axially through each of said resilient applicators which is rotatably journalled on the tubular shaft.

7. A massage carriage as defined in claim 5, and wherein said rectangular frame is composed of two rods shaped to provide two U-shaped spring sections whose end leg portions are arranged in axial alignment, a tubular shaft telescoped over and rigidly joining each pair of aligned end leg portions, and a tubular sleeve formed from a tough material having a low friction coefficient extending axially through each of said resilient applicators and rotatably journalled on the tubular shaft.

8. A massage carriage operative to apply therapeutic massage to a cushion supported body, which includes; a carriage baseframe, a pair of arched springs arranged in parallel relation and extending longitudinally of the baseframe, means for securing the ends of the arched springs to the baseframe, a suspension bar extending transversely between and secured at the ends thereof to the crown portions of said arched springs, a vibration producing motor connected to said suspension bar and extending between said arched springs, a generally rectangular outer spring frame and a generally rectangular inner spring frame each presenting a pair of substantially parallel and resiliently flexible side legs extending transversely of and medially secured to said suspension bar, the end legs of said outer and inner spring frames extending in spaced and substantially parallel relation to each other and to said suspension bar and with the end legs of each spring frame integrally joined to the side legs thereof by smoothly rounded corner portions; and a row of resilient massage applicators rotatably supported on each of said end legs for tracking contact with the underface of the body supporting cushion; said arched springs and spring frames being flexible in both longitudinal and transverse directions and resiliently responsive to the degree of pressure exerted on the resilient applicators by the undulating body suporting cushion.

9. A reciprocable massage assembly adapted to be mounted within a cushion framework and operative to apply vibratory massage to a person's body supported on the framework cushion, which includes: a tracking frame presenting a pair of parallel guide rails, and means for adjustably securing said guide rails longitudinally within said cushion framework; a message carriage presenting a baseframe, means for slidably connecting said baseframe to said guide rails, a pair of arched springs extending substantially parallel to said guide rails and having the ends thereof secured to the carriage baseframe, a suspension bar extending transversely between and secured to the crown portions of said arched springs, a vibration producing motor connected to said suspension bar, a frame of generally rectangular form presenting resilient side elements which are medially secured to said suspension bar, said end elements being integrally joined to said side elements by smoothly rounded corner portions; and transverse end elements extending substantially parallel to said suspension bar, and a series of resilient massage applicators rotatably journalled on each of said end elements; and means for reciprocating the massage carriage along said guide rails.

10. A reciprocable massage assembly as defined in claim 9 and wherein said carriage reciprocating means includes a driving motor, a continuous drive element operatively connected to said driving motor, and an actuator bar pivotally connected at one end thereof to said continuous drive element and pivotally connected at the other end thereof to the carriage baseframe.

11. A reciprocable massage assembly as defined in claim 9 and wherein said carriage reciprocating means includes a driving motor, a driving sprocket positioned on the underside of one of said guide rails and operatively connected to the driving motor shaft, an idler sprocket rotatably supported on an idler shaft secured to said guide rail, a continuous link chain trained around said driving sprocket and idler sprocket, a pitman bar pivotally connected at one end thereof to one of the chain links, and a bracket secured to said carriage baseframe and pivotally connected to the other end of said pitman bar.

12. A reciprocable massage assembly as defined in claim 9 and wherein said tracking frame includes a transverse pivot bar secured to adjacent ends of the parallel guide rails thereof, means for pivotally connecting the end portions of said pivot bar to the sides of the cushion framework, an angle bracket secured to each of said guide tracks at the other end thereof, and means for adjustably securing each of said angle brackets to the adjacent end of said cushion framework.

13. A reciprocable therapeutic massage assembly adapted to be mounted within a cushion framework and operative to apply vibratory massage to a person's body supported on the framework cushion, which includes; a tracking frame presenting a pair of parallel guide rails, and means for adjustably securing said guide rails longitudinally within said cushion framework; a massage carriage presenting a baseframe which includes a pair of glider channels slidably telescoping over said guide rails, a pair of arched springs extending substantially parallel to said guide rails and having the ends thereof secured to the carriage baseframe, a suspension bar extending transversely between and secured to the crown portions of said arched springs, a vibration producing motor connected to said suspension bar, a spring frame of generally rectangular form presenting resilient rod-shaped side elements which are medially secured to said suspension bar, transverse rod-shaped end elements extending substantially parallel to said suspension bar, and smoothly rounded corner portions integrally joining the transverse end elements to said side elements; and a series of resilient massage applicators rotatably journalled on each of said end elements; and means for reciprocating the massage carriage along said guide rails.

14. A reciprocable massage assembly as defined in claim 13 and which includes, internal slide shoes formed from a low friction coefficient material supported within each of said glider channels and positioned for sliding movement along the side surfaces of the guide rail contained therein, and an external slide shoe formed from a low friction coefficient material resiliently supported from the carriage baseframe for sliding movement along the bottom surface of each guide rail.

15. A reciprocable massage assembly as defined in claim 13 and wherein each of said guide tracks is generally channel shaped in cross section and presents laterally flared lips extending from the sides thereof, each of said glider channels presenting inturned lip portions which embrace the flared lips of the guide track over which it telescopes, friction reducing means positioned between the glider channel and flared lips of the guide track, and friction reducing means resiliently supported by said carriage baseframe and maintained in sliding contact with the bottom surface of the guide track.

References Cited

UNITED STATES PATENTS

| | | | |
|---|---|---|---|
| 3,003,497 | 10/1961 | Nunes | 128—57 |
| 3,039,458 | 6/1962 | Hill | 128—57 |
| 3,113,567 | 12/1963 | Russell | 128—33 |
| 3,322,116 | 5/1967 | Murphy et al. | 128—33 |

L. W. TRAPP, *Primary Examiner.*